United States Patent
Iagulli et al.

(10) Patent No.: US 10,449,733 B2
(45) Date of Patent: Oct. 22, 2019

(54) METHODS OF MANUFACTURING SINGLE PIECE MULTI-SPAR BOXES OF COMPOSITE MATERIAL IN A CLOSED MOULD

(71) Applicant: ALENIA AERMACCHI S.p.A., Rome (IT)

(72) Inventors: Gianni Iagulli, San Severo (IT); Giuseppe Totaro, Lucera (IT); Luigi Avagliano, Baronissi (IT); Pietrantonio Cerreta, Naples (IT)

(73) Assignee: Alenia Aermacchi S.p.A., Rome (IT)

( * ) Notice: Subject to any disclaimer, the term of this patent is extended or adjusted under 35 U.S.C. 154(b) by 340 days.

(21) Appl. No.: 14/890,923

(22) PCT Filed: May 17, 2013

(86) PCT No.: PCT/IT2013/000140
§ 371 (c)(1),
(2) Date: Nov. 13, 2015

(87) PCT Pub. No.: WO2014/184814
PCT Pub. Date: Nov. 20, 2014

(65) Prior Publication Data
US 2016/0114538 A1    Apr. 28, 2016

(51) Int. Cl.
| | |
|---|---|
| *B29C 70/34* | (2006.01) |
| *B29C 70/44* | (2006.01) |
| *B29C 70/46* | (2006.01) |
| *B29D 99/00* | (2010.01) |
| *B29L 31/30* | (2006.01) |

(52) U.S. Cl.
CPC ............ *B29C 70/345* (2013.01); *B29C 70/34* (2013.01); *B29C 70/44* (2013.01); *B29C 70/443* (2013.01); *B29C 70/46* (2013.01); *B29D 99/0014* (2013.01); *B29L 2031/3076* (2013.01); *Y02T 50/43* (2013.01)

(58) Field of Classification Search
CPC ..... B29C 70/345; B29C 70/44; B29C 70/446; B29C 70/46; B29C 70/462; B29C 70/30; B29C 70/34; B29C 70/342; B29C 70/36; B29D 99/0014; B29L 2031/3076
USPC ......................................... 244/123.8, 123.13
See application file for complete search history.

(56) References Cited

U.S. PATENT DOCUMENTS

| | | | |
|---|---|---|---|
| 5,454,895 A | 10/1995 | Imparato | |
| 6,190,484 B1 * | 2/2001 | Appa | B29C 70/32 156/169 |
| 6,217,000 B1 * | 4/2001 | Younie | B29C 33/38 249/184 |

(Continued)

FOREIGN PATENT DOCUMENTS

WO    WO 2009153344 A1 * 12/2009    ............. B25B 11/02

*Primary Examiner* — Robert C Dye
*Assistant Examiner* — Sonny V Nguyen
(74) *Attorney, Agent, or Firm* — Meunier Carlin & Curfman LLC

(57) ABSTRACT

Methods of making single piece multi-spar boxes made of composite material for aircraft are provided. Such methods include providing outer spars of the boxes which are made with a C-shaped cross-section such that the spars, during curing, are molded on the inside onto rigid, outer, lateral forming tools. As a result it is possible to obtain very precise outer profiles and positions of the spars.

5 Claims, 5 Drawing Sheets

(56) References Cited

U.S. PATENT DOCUMENTS

| | | | | |
|---|---|---|---|---|
| 2002/0069962 A1* | 6/2002 | Maxwell | ............... | B29C 70/086 |
| | | | | 156/286 |
| 2003/0192990 A1 | 10/2003 | Simpson et al. | | |
| 2004/0043680 A1* | 3/2004 | Mead | .................... | B29C 33/307 |
| | | | | 441/74 |
| 2010/0170613 A1* | 7/2010 | Kendall | .................. | B29C 35/02 |
| | | | | 156/60 |
| 2010/0193636 A1* | 8/2010 | De Vita | ................ | B29C 66/721 |
| | | | | 244/123.1 |
| 2011/0226407 A1* | 9/2011 | Inserra Imparato | .... | B29C 70/44 |
| | | | | 156/196 |
| 2011/0243750 A1* | 10/2011 | Gruhn | ..................... | B29B 11/16 |
| | | | | 416/226 |
| 2013/0149164 A1* | 6/2013 | Hansen | ................. | B64F 5/0009 |
| | | | | 416/226 |
| 2014/0284431 A1* | 9/2014 | Grankaell | ............... | B29C 66/63 |
| | | | | 244/90 R |

* cited by examiner

METHODS OF MANUFACTURING SINGLE PIECE MULTI-SPAR BOXES OF COMPOSITE MATERIAL IN A CLOSED MOULD

CROSS-REFERENCE TO RELATED APPLICATIONS

This application is a National Phase Application of PCT International Application No. PCT/IT2013/000140, International Filing Date, May 17, 2013 which is hereby incorporated by reference in its entirety.

FIELD OF THE INVENTION

The present invention relates to a method of manufacturing a single piece multi-spar box made of composite material for aircraft. The multi-spar boxes to which reference is made in this description are suitable for forming an integral part of the horizontal stabilizer and other primary structures, such as the tail fin and wing boxes.

BACKGROUND OF THE INVENTION

For a better understanding of the state of the art and the problems relating thereto a method of the conventional type, as known for example from U.S. Pat. No. 5,454,895, for manufacturing a multi-spar box made of fibre-reinforced, polymerizable, thermosetting material (or "composite material"), will be described firstly.

In FIG. 1, a multi-spar box 10 comprises a top panel 11 joined to a bottom panel 12 by means of a series of parallel spars 13a, 13b, 14a, 14b with an I-shaped cross-section (or "H" cross-section), each formed by the joining together of two oppositely arranged elements with a C-shaped cross-section and fillers in the nodal zones. The method envisages using inner tools 15 (so-called "plugs") which have the function of positioning the spars with respect to the panels 11, 12 of the box and supporting tubular bags 16 which are placed around the inner tools 15 for application of the vacuum. Typically, the inner tools 15 are substantially rigid, box-like structures. The bottom panel 12 is placed on a bottom curing mould 17. The spars 13, 14 already assembled and preformed using the same composite material are arranged in a parallel manner around the inner tools 15, wrapped inside the tubular bags 16. At this point the inner tools 15 with the spars 13, 14 are positioned on the bottom panel 12. The top panel 11 made of composite material, together with a top curing plate 18, is then applied on top of the preformed spars. The entire assembly is enclosed inside a vacuum bag. The top and bottom curing plates 17, 18 are sealed laterally by bags 19. The vacuum is applied to the system thus formed.

During the autoclave polymerization step, pressure is applied by the bag to the outer surfaces of the (top and bottom) panels and to the bases of the spars so as to compact them against the corresponding plates of the mould, while the cores of the spars are compacted by the adjacent bags 16. The cores of the outer spars 13b are acted on externally by means of the lateral bags 19.

The inner tools 15 give the tubular bags 16 their shape so that said shape resembles as far as possible the final shape of the cavity which is to be obtained. The inner tools 15 are designed with dimensions smaller than those of the inner profile of the cavity both so as to be able to receive the tubular bags and so as to ensure that they can be extracted from the structure after the latter has been polymerized. In fact, the inner tools limit the deformation of the assembly formed by each of the pairs of adjacent internal tubular bags and by the core of the spars situated between them. In fact, when, as a result of the heat, fluidification of the resin occurs and the core of the spar could assume any shape, the walls of the adjacent inserts force the membrane formed by the adjacent bags and the core of the spar to remain in the space defined between them.

All the spars of the boxes manufactured using the conventional method described above do not have precise dimensions. In particular, the cores of these spars are subject to bowing (FIG. 2) or tilting (FIG. 3) in an uncontrolled manner, or lateral displacement with respect to the design position (FIG. 4).

The cores of the outer spars act as a support on which various structural elements, such as hinges and supports for the actuators of the movable surfaces and means for fastening the tail unit to the fuselage, are assembled. Therefore, imprecision in the dimensions or position of the cores of the outer spars constitutes a problem since the outer surfaces of bowed, inclined or displaced spars do not provide precise reference surfaces for mechanical connection of the accessories.

With the current manufacturing methods the outer spars have highly variable profiles with variations of up to 3 mm. There exist constructional requirements in respect of assembly, whereby the residual gap between the joining surfaces must be smaller than 0.127 mm; this results in the need to fill the gaps or empty spaces which are bigger than the permitted size by introducing solid fillers or "shims" between the outer surface of the core of the outer spar and the surface of the mechanical connection element. The geometrical form of the shims is specifically defined for each specific joint and cannot be determined beforehand. The construction of the shims, apart from the fact that it cannot be defined before assembly of the parts to be joined together, requires a very expensive manufacturing process. In fact, for each joint it is required to measure the gaps between the parts with great precision, generate their surfaces by means of CAD and part programs, manufacture each dedicated shim by means of numerical-control milling and, finally, check for the necessary fit when installed.

SUMMARY OF THE INVENTION

The object of the present invention is therefore to manufacture multi-spar boxes according to a method which does not have the drawbacks mentioned above, so as to produce boxes having a high degree of geometric precision on the outer surfaces of the cores of the outer spars.

According to the invention, the aforementioned object, together with other objects and advantages, which will be understood more clearly below, can be achieved by methods as described and claimed herein. The invention is based on the observation that, in the prior art, the variability in the position of the spars and their limited geometrical precision is because the lateral spars are polymerized in a condition where their outer surfaces are delimited and formed by nylon bags. In short, the present methods provide that the outer spars of the box are made with a C-shaped cross-section and that these spars, during curing, are moulded on the inside onto rigid, outer, lateral forming tools. As a result it is possible to obtain very precise outer profiles and positions of the spars.

A number of non-limiting embodiments of the invention now will be described with reference to the attached drawings.

DETAILED DESCRIPTION

Figure 1:
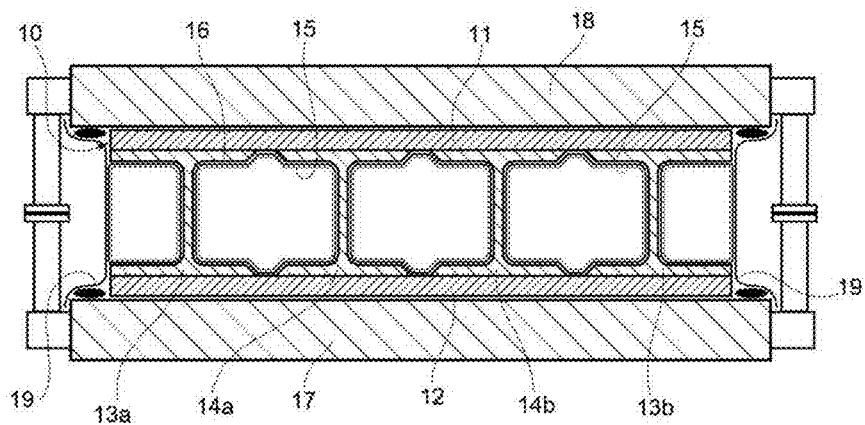
FIG. 1 is a cross-sectional view of an apparatus for manufacturing a multi-spar box of known design.
Figure 2:
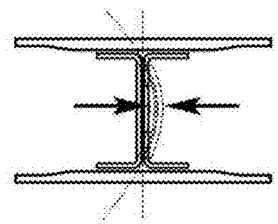
FIGS. 2 to 4 are schematic cross-sectional views of undesirable deformations or incorrect positioning of a spar.
Figure 3:
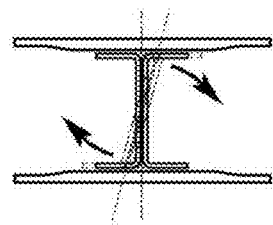
Figure 4:
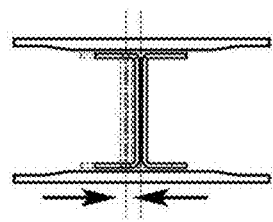
Figure 5:
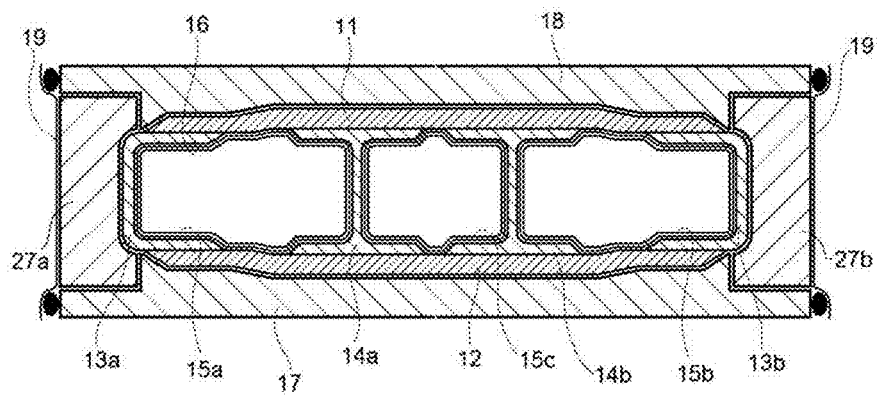
FIG. 5 is a schematic cross-sectional view of an apparatus for manufacturing a multi-spar box by a method according to the present invention.
Figure 6:
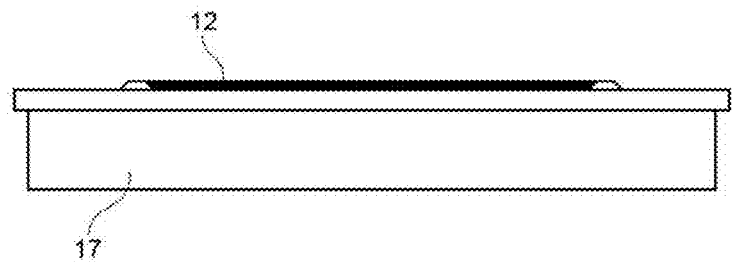
FIGS. 6 to 8 illustrate schematically steps for preparing structural elements of the box according to FIG. 5.

The method is aimed at the manufacture of a multi-spar box, for example as shown in FIG. 5, comprising a top panel 11 joined to a bottom panel 12 by means of a series of parallel spars 13a, 13b, 14a, 14b. The spars include two outer lateral spars 13a, 13b and one or more inner or intermediate spars 14a, 14b, in the present example two in number.

The lateral or outer spars 13a, 13b have a C-shaped cross-section with their respective concavities facing each other, i.e. oppositely arranged, directed towards the inside or the centre of the box to be manufactured. The inner or intermediate spars 14a, 14b have preferably an I-shaped cross-section (or "H" cross-section), each formed by joining together two oppositely arranged elements with a C-shaped cross-section.

The manufacturing process envisages the formation of the bottom panel 12 and top panel 11 of the box by means of rolling of fabric sheets preimpregnated with resin on curing plates 17, 18. These steps are known per se and therefore will not be described here in detail.

In order to manufacture a multi-spar box such as that shown in FIG. 5, two intermediate spars 14a, 14b with a I-shaped (or H-shaped) cross-section and two outer spars 13a, 13b with a C-shaped cross-section are required. The number of intermediate spars may vary from a minimum of one to three and more, depending on requirements.

Figure 7:
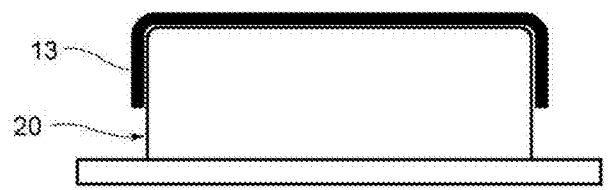

According to methods which are known per se in the art, each outer spar with a C-shaped cross-section is formed from a single flat element obtained by rolling fabric sheets preimpregnated with resin. The flat element is then transferred onto a forming mandrel 20 (see FIG. 7) and subjected to thermoforming The thermoforming step envisages homogeneous heating of the flat element by means of a heat source, typically an infrared lamp, situated above the flat element. Forming envisages folding the ends of the flat element protruding beyond the edges of the mandrel by means of the action of a bag/membrane onto which the vacuum is applied in a gradual and controlled manner so as to cause the element, which is initially flat, to adhere to the forming mandrel which defines the final desired C-shaped form thereof (FIG. 7). Once the element adheres completely to the forming mandrel, the heat source is switched off and the vacuum applied to the bag/membrane is maintained until complete cooling at room temperature occurs.

Figure 8:
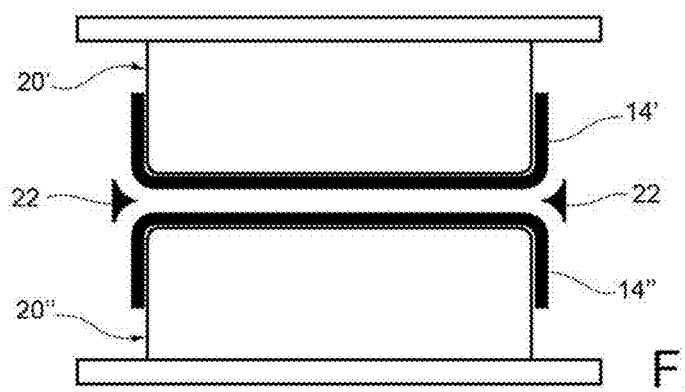

In a manner known per se, each intermediate spar with a double T cross-section 14a, 14b is formed by assembling together two elements 14', 14" with a C-shaped cross-section. Each of these C-shaped elements is formed by means of rolling and thermoforming as described above. Two C-shaped elements (FIG. 8) are joined together as two oppositely arranged Cs: a layer of adhesive is applied along the zone connecting together each of the two profiled parts, which are then assembled. The step is performed by overturning a first mandrel 20' on which one (14') of the two C-shaped elements has been formed beforehand and positioning the first mandrel on top of a second mandrel 20" which has another C-shaped element 14" so as to arrange the two cores next to each other. It is then possible to apply fillers 22 with a substantially triangular cross-section along the longitudinal recesses which are situated in the connection zones between the cores and the bases of the two C-shaped elements joined together, thus obtaining the double T cross-section.

The method envisages the provision of longitudinally elongated rigid inner tools (or plugs) 15 which are lined with airtight tubular bags 16, in a manner similar to that described in U.S. Pat. No. 5,454,895 herein incorporated by reference. The inner tools 15 must be positioned inside the longitudinal cavities which are defined inside the box between the base flanges and the cores of the adjacent spars. The tubular bags 16 include a series of layers, the first or innermost one of which is an impermeable tubular bag, preferably made of nylon. A ventilation layer, preferably consisting of polyester or glass fibre, is wound around the tubular bag. A tubular release film, preferably consisting of FEP, is applied on top thereof. Before positioning the spar on the inner tool 15 lined with the tubular bags 16 the tubular release film is sealed on the inner tool and the vacuum is applied so that the release film is shrunk against the body of the inner tool 15; this therefore results in a lined rigid inner tool having a sufficiently precisely defined shape. The inner tools 15 give the tubular bags 16 a shape which resembles as far as possible the final shape of the cavity which is to be obtained, containing the resin fluidized in the following operating step performed in an autoclave.

For manufacture of a box such as that shown in the example of FIG. 5 three inner tools must be inserted inside the box to be cured. Two of these inner tools 15a, 15b, which are defined here as lateral tools, must be positioned in the two respective lateral spaces or longitudinal cavities which are defined between the core and the bases of one of the two outer C-shaped spars and the core and the two bases of the closest double T spar. A third central inner tool 15c must be inserted between the cores and the bases of the two intermediate spars 14a, 14b.

Figure 9:
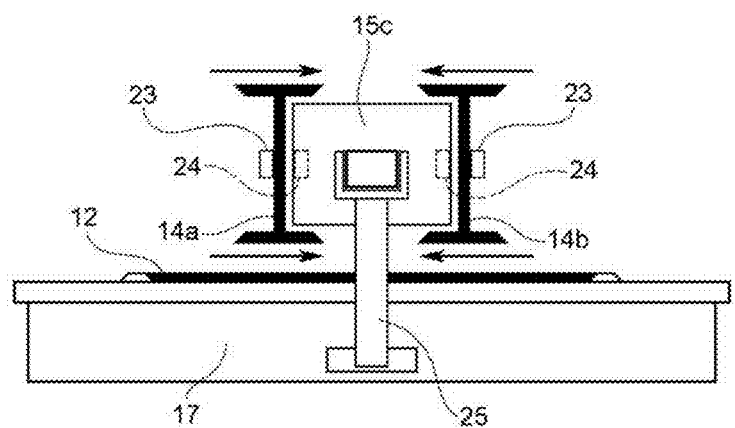
FIGS. 9 and 15 show a sequence of steps of a method according to an embodiment of the present invention.

Two double T spars 14a, 14b are transferred to the central inner tool 15c (FIG. 9) where they may be held in position by means of auxiliary devices, such as magnets 23 which cooperate with steel plates 24 incorporated in the inner tool 15c.

The central inner tool 15c is supported at its two opposite ends by two supports 25 (only one of which is visible in the drawings) which are fixed, for example, on the bottom element. During this step, the double T spars are supported by the central inner tool 15c on top of the bottom panel 12.

Figure 10:
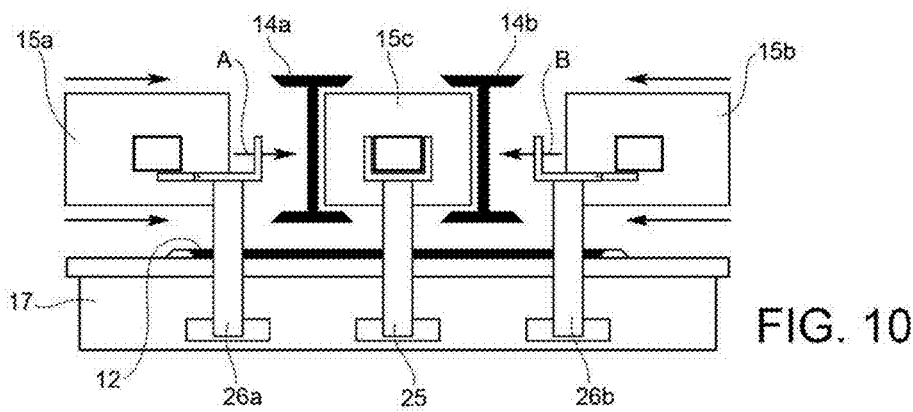

Two lateral inner tools 15a, 15b (FIG. 10) are mounted alongside the central inner tool 15c. The two lateral inner tools are positioned so that they penetrate partially inside the respective lateral spaces on the opposite sides of the two intermediate spars 14, between the top and bottom bases. The inner lateral faces of the lateral inner tools 15a, 15b are directed towards the cores of the two intermediate spars 14 to be polymerized. The lateral inner tools 15*a*, 15*b* are positioned by moving them in a horizontal plane, in a direction transverse to the longitudinal direction in which the box extends, as indicated by the arrows A, B in FIG. 10. The lateral inner tools are supported by respective pairs of end supports 26*a*, 26*b* which are fixed with respect to the bottom curing plate 17.

Figure 11:
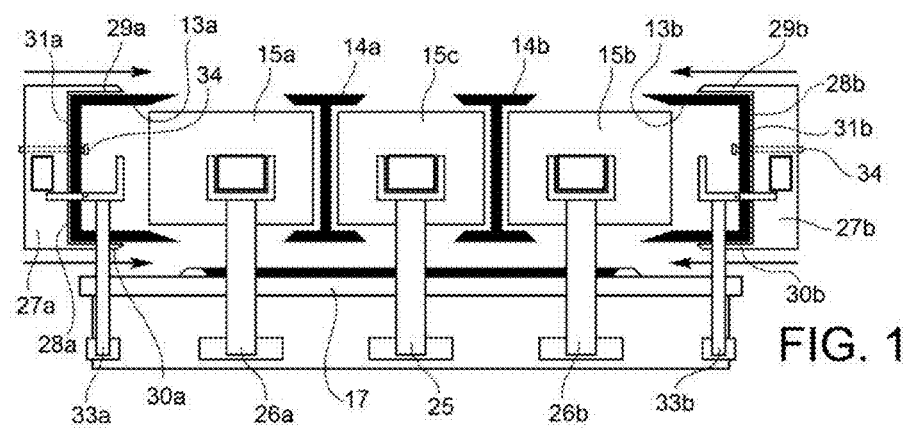

The two outer spars with a C-shaped cross-section 13*a*, 13*b* are mounted on respective lateral outer tools 27*a*, 27*b* (FIG. 11) each having a seat 28*a*, 28*b* with a C-shaped cross-section extending in the longitudinal direction. Each of the C-shaped seats has a top horizontal surface 29*a*, 29*b*, a bottom horizontal surface 30*a*, 30*b*, and a lateral vertical surface 31*a*, 31*b* which joins together the top and bottom horizontal surfaces.

The two C-shaped seats 28*a*, 28*b* have respective concavities facing each other, i.e. oppositely arranged, directed towards the inside or the centre of the box to be manufactured. The concavity of the outer spar 13*a* matches the concavity of the seat 28*a*, and the concavity of the outer spar 13*b* matches the concavity of the seat 28*b*.

The outer spars 13*a*, 13*b* are inserted partially inside the respective seats 28*a*, 28*b* with a predetermined minimum play and have end parts of their top and bottom flanges which project outside of the C-shaped seat.

Figure 12:
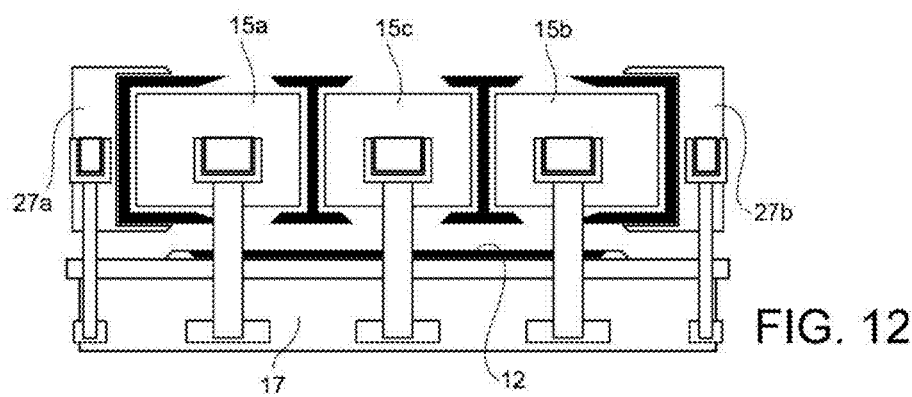

The lateral outer tools 27*a*, 27*b* are moved transversely closer to the lateral inner tools 15*a*, 15*b* (FIG. 12) so as to arrange the cores and the horizontal flanges of the outer spars 13*a*, 13*b* adjacent to corresponding surfaces of the lateral inner tools 15*a*, 15*b*. More particularly, the cores of the C-shaped spars 13*a*, 13*b* are arranged facing the vertical lateral surfaces of the lateral inner tools 15*a*, 15*b*, and the top and bottom flanges of the C-shaped spars are arranged facing respective top and bottom surfaces of the lateral inner tools 15*a*, 15*b*. The lateral outer tools 27*a*, 27*b* are supported by respective pairs of end supports 33*a*, 33*b* which are connected to the bottom curing plate 17.

In order to avoid undesirable relative movements of the outer spars 13*a*, 13*b* and the respective lateral outer tools 27*a*, 27*b* during the various assembly operations, removable pins 34 (FIG. 11) may be provided, these being made, for example, of plastic and temporarily fastening the C-shaped spars to their respective outer tools. The position of the pins 34, which pass through the cores, is defined in areas where, during a final production step, access holes are formed. The lateral outer tools 27*a*, 27*b* may have through-holes for receiving the pins 34 and allowing the destruction thereof, from the outside, at the end of the polymerization step.

Figure 13:
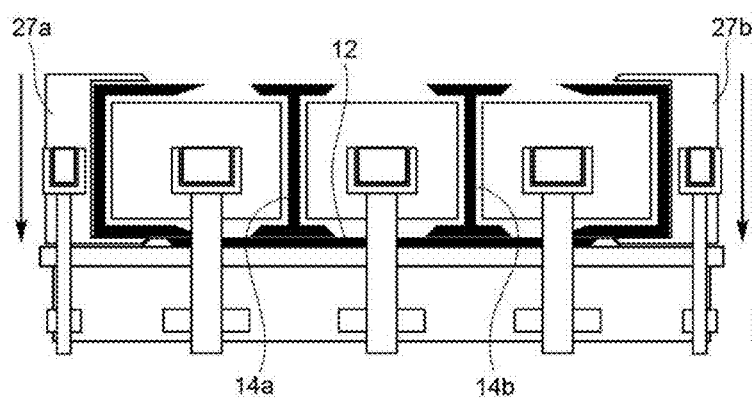

Then (FIG. 13) the inner tools 15*a*, 15*b*, 15*c* and the lateral outer tools 27*a*, 27*b* are lowered in synchronism so as to bring the bottom bases of the spars 13*a*, 13*b*, 14*a*, 14*b* into contact with the bottom panel 12.

Figure 14:
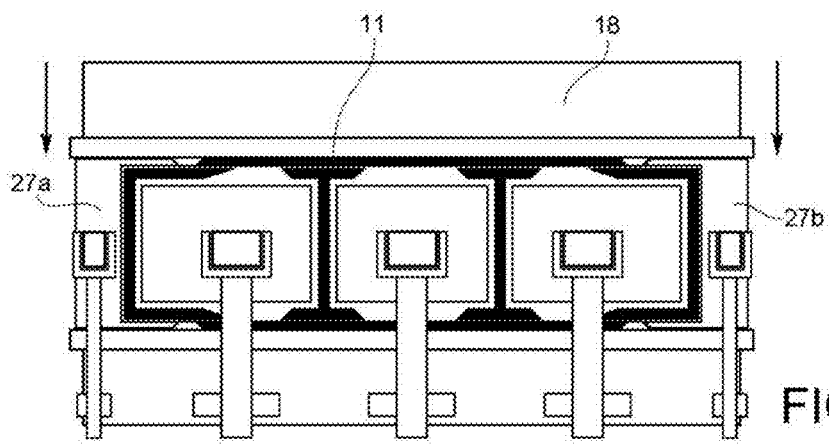

The top panel 11 with the associated curing plate 18 is overturned, being transferred on top of the semi-assembled box and brought into contact with the top bases of the spars (FIG. 14). The two lateral outer tools 27*a*, 27*b* are fixed to the top curing plate 18 and bottom curing plate 17, thus forming, together with the plates 17 and 18, a closed mould. In this closed mould condition, the lateral outer tools 27*a*, 27*b* are arranged vertically between the bottom curing plate 17 and the top curing plate 18 so as to support the latter.

Figure 15:
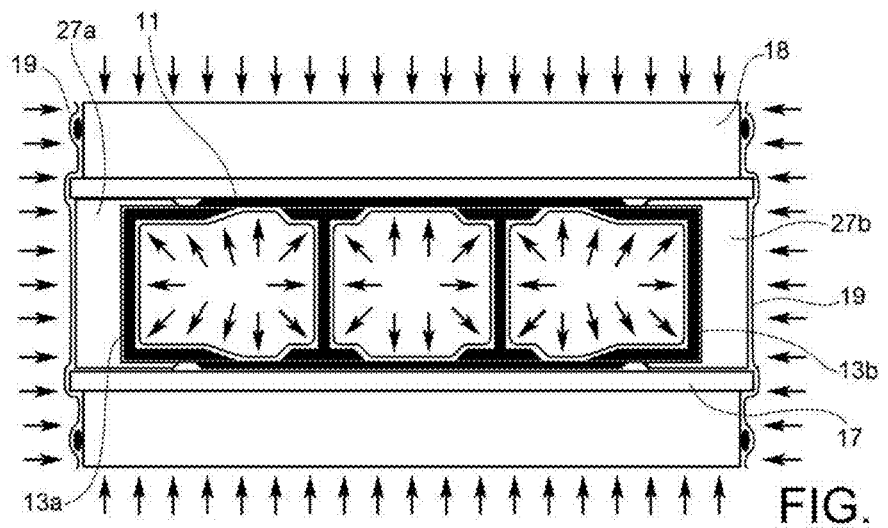

The curing plates 17, 18 are sealed laterally by nylon vacuum-bag film sheets 19 with ventilation fabric, visible in FIG. 15. The outer bag-film sheets 19 are each sealed to both the plates 17 and 18 and cover on the outside each of the two lateral outer tools 27*a* and 27*b*. The curing plates 17 and 18, which are manufactured vacuum-sealed, together with the tubular bags provided on each rigid inner tool and the nylon side sheets 19, form the vacuum system for the final polymerization cycle.

The vacuum bag is formed by sealing together the tubular bags 16 which are present on the inner tools 15 along the cores of the spars and sealing the remaining parts onto the curing plates 17, 18. Closing of the bag along the outer spars is performed by providing additional strips which are sealed onto the curing plates 17, 18 of the top and bottom panels of the box and which incorporate the lateral outer tools 27*a*, 27*b* (FIG. 15).

The open opposite ends of all the tubular bags which line the tools are sealed so that the pressure applied in an autoclave during the following curing step causes expansion of the tubular bags towards the component to be cured, compressing the tubular bags against the two faces of the internal cavities of the box. The internal cavities of the box are defined by the outer spars, the intermediate spars and the top and bottom panels.

The open opposite ends of the tubular bags 16 which line each inner tool 15*a*, 15*b*, 15*c* are sealed as explained hereinbelow, so that each tubular bag is able to be pressurized and transfer the pressure of the environment of the autoclave to the cores of the spars and to the mutually facing surfaces of the top and bottom bases of the spars.

Figure 16:
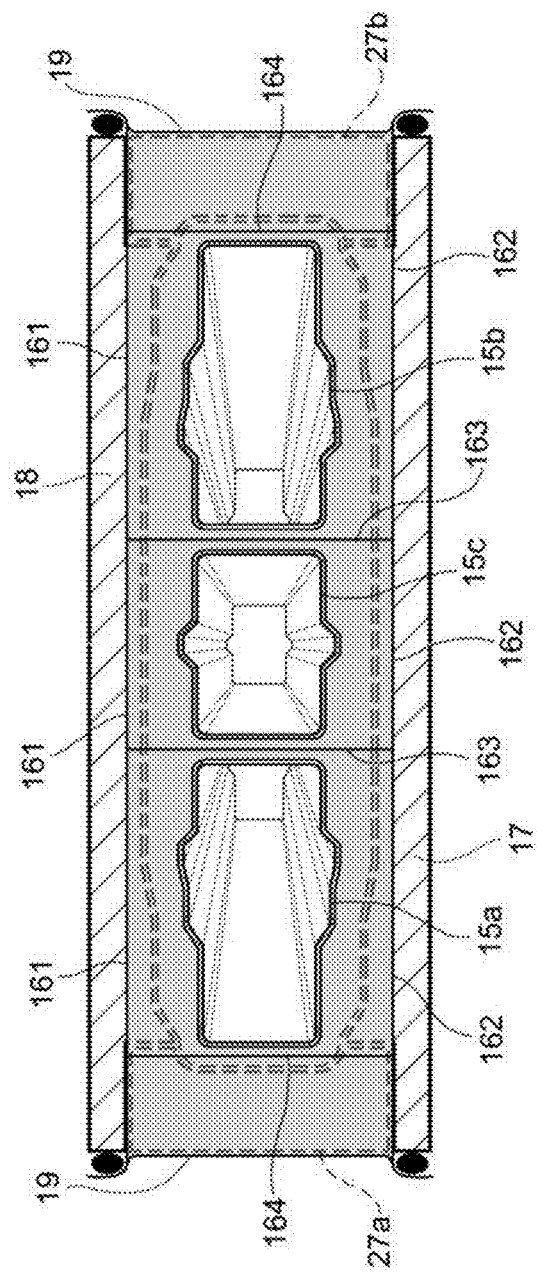
FIG. 16 shows schematically the sealing lines of vacuum bags.

As schematically shown in FIG. 16, the top edges 161 of the ends of the tubular bags 16 are sealed together with the top curing plate 18, while the bottom edges 162 of the ends of the tubular bags 16 are sealed together with the bottom curing plate 17. The vertical edges 163 between adjacent tubular bags are sealed together, while the vertical edges 164 of the tubular bags adjacent to the lateral spars 13*a*, 13*b* are sealed together with the outer bag-film sheets 19. The (top and bottom) longitudinal edges of the outer bag-film sheets 19 are sealed respectively on the top curing plate 18 and bottom curing plate 17 (FIG. 15). By means of a respective valve (not shown), vacuum is applied to the volume between each tubular bag and the other elements together with which it has been sealed.

Then the closed mould is transferred into an autoclave for curing the box by applying a programmed heat and pressure cycle.

It can be understood that in the autoclave curing process the outer surface of the box is moulded against the rigid components 17, 18, 27*a*, 27*b* which therefore act as a closed mould. It follows that the outer surface of the box, and in particular the outer spars 13*a*, 13*b*, will have a surface finish and a dimensional precision of the outer surface which is typical of die-moulded parts and therefore significantly better than that which can be obtained using conventional processes. Experimental tests carried out by the Applicant have shown that the outer profile of the outer spars complies with the extremely small tolerance ranges (equal to about ±0.1 mm), such that it is not required to install mounting shims in the gaps, for adjustment with the other surfaces of the parts being joined together.

The invention may be subject to modifications relating to shapes, sizes and arrangement of parts, as well as constructional details and materials used. For example, the number and shape of the spars and the inner and outer tools may vary, depending on particular requirements. It is understood that each embodiment may be combined with any other embodiment. The invention, moreover, is not limited to the embodiments described, but may be varied based on the teachings provided herein without departing from the intended scope of the claims.

The invention claimed is:

1. A method of manufacturing a single piece multi-spar box made of composite material for aircraft, comprising:

placing a bottom panel of composite material on a first plate and a top panel of composite material on a second plate;

suspending, above the bottom panel, one or more intermediate spars of composite material arranged between elongated inner tools which are each enclosed inside a respective pressurisable impermeable tubular bag;

arranging two outer lateral spars of composite material with a C-shaped cross-section inside two respective C-shaped seats formed in two respective rigid, lateral, outer tools, where the two outer lateral spars have respective concavities directed towards each other and the two seats have respective concavities directed towards each other;

moving the lateral outer tools towards each other such that the inner tools wrapped in pressurisable bags are partially inserted inside the C-shaped outer spars;

simultaneously lowering the inner tools and the lateral outer tools so as to bring bottom bases of said intermediate and lateral spars into contact with the bottom panel;

transferring the second plate with the top panel above said intermediate and lateral spars;

lowering the second plate so as to bring the top panel into contact with top bases of said intermediate and lateral spars;

locking the two lateral outer tools to the first plate and to the second plate, so as to form, together with the plates, a closed mould wherein in the closed mould condition the lateral outer tools are arranged vertically between the first plate and the second plate so as to support the second plate so that the multi-spar box to be polymerized is closed between the first plate, the second plate and the two lateral outer tools;

sealing open opposite ends of the tubular bags so that the pressure applied in an autoclave during a following polymerization step causes expansion of the tubular bags, compressing them against bases and cores of said intermediate and lateral spars; and curing the box in an autoclave by applying a programmed cycle of heat and pressure.

2. The method of claim 1, wherein the one or more intermediate spars is/are retained on the one or more central inner tools by magnets which cooperate with plates of ferromagnetic material which are incorporated in one or more inner tools.

3. The method of claim 1, wherein the outer spars are temporarily fixed to the lateral outer tools by removable pins which are inserted through the outer spars and into through-holes provided in the lateral outer tools.

4. The method of claim 1, wherein the outer spars are inserted partially inside the respective C-shaped seats of the lateral outer tools with a predetermined minimum distance and wherein the spars, in this partially inserted condition, have end portions of their top and bottom flanges which project outside the respective C-shaped seats.

5. The method of claim 1, wherein the step of sealing the open opposite ends of the tubular bags further comprises the steps of:

sealing a top edge of each of the longitudinal ends of each of the tubular bags together with the second plate;

sealing a bottom edge of each of the longitudinal ends of each of the tubular bags together with the first plate;

sealing together vertical edges of each of the longitudinal ends of adjacent tubular bags; and sealing vertical edges of the tubular bags adjacent to the outer lateral spars together with respective outer bag-film sheets, which outer bag-film sheets are each sealed together with the first plate and the second plate and cover on the outside each of the two rigid, lateral, outer tools.

* * * * *